US012749786B2

(12) United States Patent
Wang et al.

(10) Patent No.: US 12,749,786 B2
(45) Date of Patent: Sep. 29, 2026

(54) COAXIAL FILTER INCLUDING BENT HIGH IMPEDANCE SEGMENTS AND LOW IMPEDANCE SEGMENTS WITH BYPASS GROOVES

(71) Applicant: Suzhou Luxshare Technology Co., Ltd., Suzhou City (CN)

(72) Inventors: Wei Wang, Suzhou City (CN); Guangwen Yang, Suzhou City (CN); Xinghua Sun, Suzhou City (CN)

(73) Assignee: SUZHOU LUXSHARE TECHNOLOGY CO., LTD., Suzhou City (CN)

( * ) Notice: Subject to any disclaimer, the term of this patent is extended or adjusted under 35 U.S.C. 154(b) by 85 days.

(21) Appl. No.: 18/932,131

(22) Filed: Oct. 30, 2024

(65) Prior Publication Data

US 2025/0246789 A1 Jul. 31, 2025

(30) Foreign Application Priority Data

Jan. 29, 2024 (CN) ........................ 202420213986.X

(51) Int. Cl.
*H01P 1/202* (2006.01)

(52) U.S. Cl.
CPC .................................... *H01P 1/202* (2013.01)

(58) Field of Classification Search
CPC ........................................................ H01P 1/202
USPC .................................................. 333/202, 206
See application file for complete search history.

(56) References Cited

U.S. PATENT DOCUMENTS 6,255,920 B1 * 7/2001 Ohwada ................ H01P 1/2039
333/202

FOREIGN PATENT DOCUMENTS

| | | | | |
|---|---|---|---|---|
| CN | 202217757 U | | 5/2012 | |
| CN | 209544573 U | | 10/2019 | |
| CN | 113708032 A | | 11/2021 | |
| CN | 215771490 U | | 2/2022 | |
| CN | 114243237 A | * | 3/2022 | ................ H01P 1/20 |
| CN | 218472256 U | | 2/2023 | |

(Continued)

OTHER PUBLICATIONS

Taiwanese Office Action and Search Report for Taiwanese Application No. 113110189, dated Aug. 8, 2025, with English translation.

*Primary Examiner* — Andrea Lindgren Baltzell
*Assistant Examiner* — Victor Cole
(74) *Attorney, Agent, or Firm* — Birch, Stewart, Kolasch & Birch, LLP

(57) ABSTRACT

Provided is a filter, belonging to the field of radio frequency product technology. The filter includes a low-pass filter structure. The low-pass filter structure includes a high impedance segment and a low impedance segment connected to each other. At least one high impedance segment is bent to form a bent high resistance segment. The bent high resistance segment includes a first rod segment and a second rod segment that are connected to each other and disposed at an included angle. A low impedance segment is provided with a bypass groove. A high resistance connection segment is disposed in the bypass groove. One end of the high resistance connection segment is connected to the bottom of the bypass groove, and the other end of the high resistance connection segment is connected to a high impedance segment.

16 Claims, 4 Drawing Sheets

(56) References Cited

FOREIGN PATENT DOCUMENTS

| | | | | |
|---|---|---|---|---|
| JP | 4913217 | B2 | 4/2012 | |
| KR | 101478483 | B1 * | 12/2014 | ................ H01P 1/22 |

* cited by examiner

COAXIAL FILTER INCLUDING BENT HIGH IMPEDANCE SEGMENTS AND LOW IMPEDANCE SEGMENTS WITH BYPASS GROOVES

CROSS-REFERENCE TO RELATED APPLICATION(S)

This application claims priority to Chinese Patent Application No. 202420213986X filed Jan. 29, 2024, the disclosure of which is incorporated herein by reference in its entirety.

TECHNICAL FIELD

The present application relates to the field of radio frequency product technology and, in particular, to a filter.

BACKGROUND

Generally, a filter is provided with a low-pass filter structure, which plays the role of high frequency suppression to filter the high frequency harmonic and high frequency noise of a signal.

The low-pass filter structure includes high impedance segments and low impedance segments that are alternately connected coaxially. Two adjacent low impedance segments are connected through a high impedance segment. Two adjacent high impedance segments are connected through a low impedance segment. The low impedance segment is cylindrical and has poor suppression effect. If the required suppression effect needs to be implemented, the length of a low impedance segment needs to be additionally increased, that is, the total length of the low-pass filter structure needs to be increased. As a result, the length of the filter is relatively long, and the volume of a product is improved.

For the above problems, in the related art, a bypass groove that surrounds a high impedance segment is generally disposed on a low impedance segment to increase the length of the high impedance segment. However, the length of the low impedance segment is limited. In the case where the total length of a low-pass filter structure is fixed, the increase in the length of the high impedance segment is limited.

SUMMARY

The object of the present application is to provide a filter, which can effectively increase the length of a high impedance segment of a low-pass filter structure.

To achieve this object, the present application adopts the solutions below.

A filter includes a low-pass filter structure. The low-pass filter structure includes a high impedance segment and a low impedance segment connected to each other. Two adjacent high impedance segments are connected through a low impedance segment. Two adjacent low impedance segments are connected through a high impedance segment. At least one high impedance segment is bent to form a bent high resistance segment. The bent high resistance segment includes a first rod segment and a second rod segment that are connected to each other and disposed at an included angle. A low impedance segment is provided with a bypass groove. A high resistance connection segment is disposed in the bypass groove. One end of the high resistance connection segment is connected to the bottom of the bypass groove, and the other end of the high resistance connection segment is connected to a high impedance segment.

Preferably, the first rod segment and the second rod segment are perpendicular to each other.

Preferably, the filter also includes an outer sleeve housing. The low impedance segment is disposed in the outer sleeve housing.

Preferably, the low-pass filter structure also includes a first connection segment and a second connection segment. The high impedance segment and the low impedance segment are disposed between the first connection segment and the second connection segment.

Preferably, the first connection segment is connected to one low impedance segment, and the second connection segment is connected to the other low impedance segment.

Preferably, the filter also includes a tap. The first connection segment abuts against the tap.

Preferably, the filter also includes a connector. One end of the tap is connected to the connector, and the other end of the tap is connected to the first connection segment.

Preferably, the filter also includes an insulating sleeve and a metal rod. The metal rod is inserted into the insulating sleeve. The tap is clamped between the metal rod and the connector.

Preferably, the filter also includes a connection rod. The second connection segment is provided with a connection groove. The connection groove abuts against the periphery wall of the connection rod.

Preferably, the filter also includes a resonant rod. One end of the connection rod abuts against the resonant rod, and the other end of the connection rod abuts against the second connection segment.

The present application has the beneficial effects below.

The high impedance segment is bent to form the bent high resistance segment. The first rod segment and the second rod segment of the bent high resistance segment are disposed at an included angle, so that a longer low-pass filter structure can be disposed in limited space, thereby implementing better remote suppression action. On this basis, the high resistance connection segment connected to the high impedance segment is disposed in the bypass groove of the low impedance segment. Thus, the length of the high impedance segment is effectively increased, the space utilization rate is improved, and at the same time, the remote suppression action is further improved.

REFERENCE LIST

1 low-pass filter structure

11 high impedance segment

Figure 1:
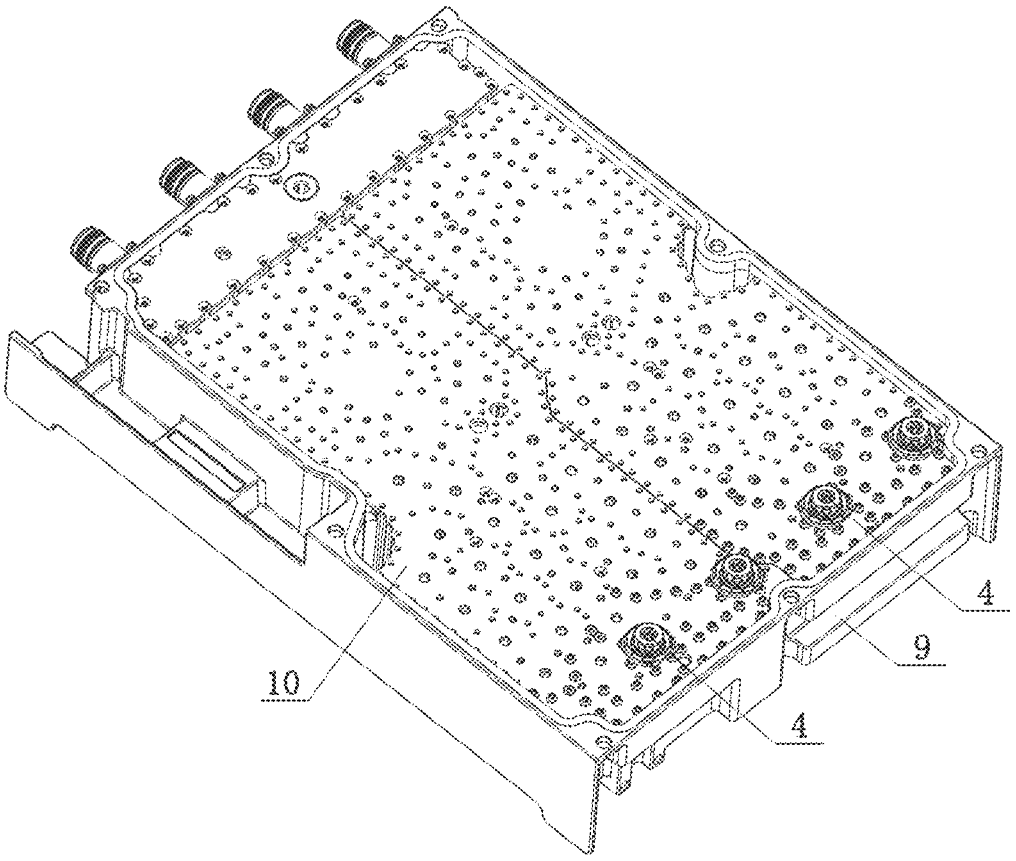
FIG. 1 is a view illustrating the structure of a filter according to an embodiment of the present application.

111 first rod segment
112 second rod segment
12 low impedance segment
121 bypass groove
122 high resistance connection segment
13 first connection segment
14 second connection segment
141 connection groove
2 outer sleeve housing
3 tap
4 connector
5 insulating sleeve
6 metal rod
7 connection rod
8 resonant rod
9 bottom housing
10 top cover

DETAILED DESCRIPTION

Embodiments of the present application are described in detail hereinafter. Examples of the embodiments are illustrated in the drawings, where the same or similar reference numerals indicate the same or similar elements or elements having the same or similar functions. The embodiments described below with reference to the drawings are exemplary, intended to explain the present application and not to be construed as limiting the present application.

In the description of the present utility mode, unless otherwise expressly specified and limited, the term "interconnected", "connected" or "fixed" is to be construed in a broad sense, for example, as securely connected or detachably connected; mechanically connected or electrically connected; directly interconnected or indirectly connected to each other via an intermediary; or internally connected between two components or interactional relations between two components. For those of ordinary skill in the art, specific meanings of the preceding terms in the present application may be understood according to specific situations.

In the description of the present application, unless otherwise expressly specified and limited, when a first feature is described as "on" or "below" a second feature, the first feature and the second feature may be in direct contact, or the first feature and the second feature may be in contact via another feature therebetween instead of being in direct contact. Moreover, when the first feature is described as "on", "above", or "over" the second feature, the first feature is right on, above, or over the second feature, the first feature is obliquely on, above, or over the second feature, or the first feature is simply at a higher level than the second feature. When the first feature is described as "under", "below" or "underneath" the second feature, the first feature is right under, below or underneath the second feature, the first feature is obliquely under, below or underneath the second feature, or the first feature is simply at a lower level than the second feature.

Technical solutions of the present application are further described below through embodiments in conjunction with the drawings.

Figure 2:
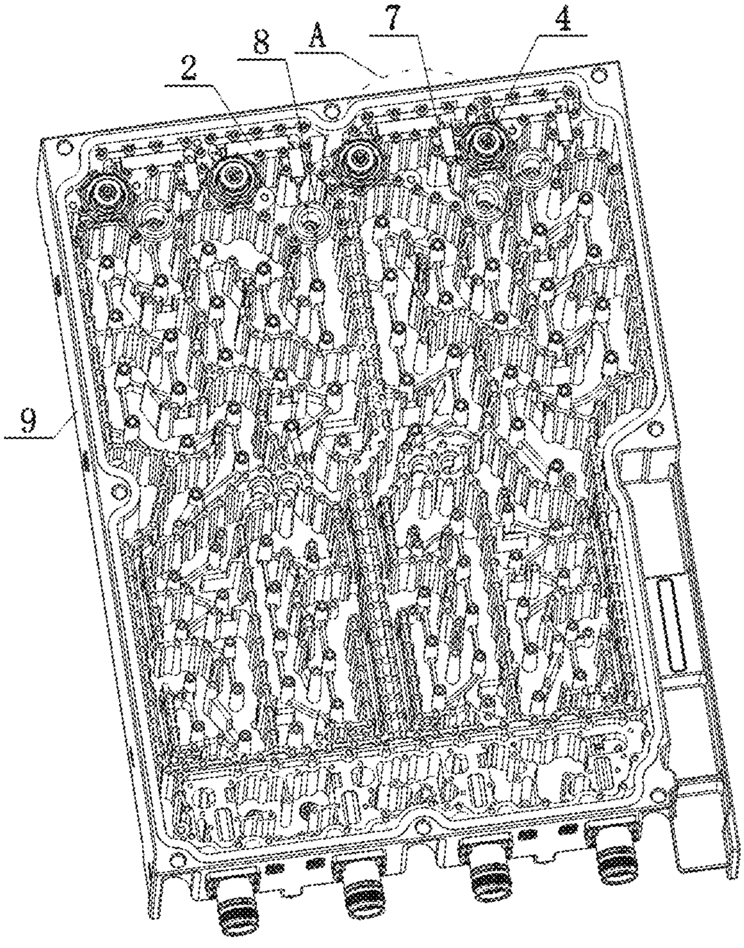
FIG. 2 is a view illustrating the structure of a filter according to an embodiment of the present application without a top cover.
Figure 3:
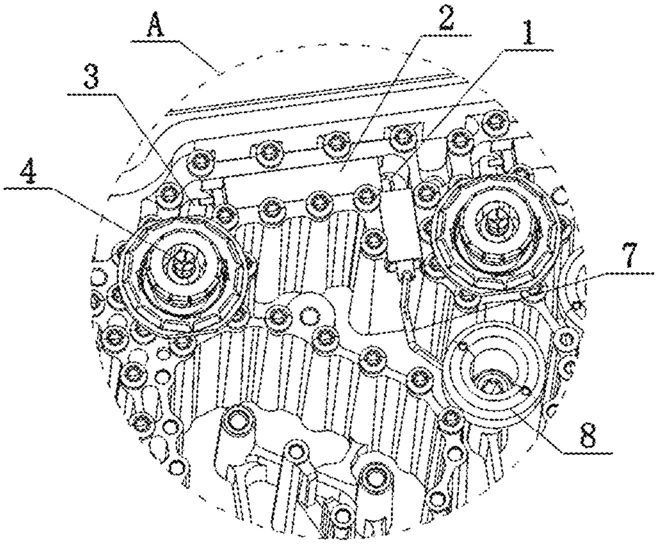
FIG. 3 is an enlarged view of part A of FIG. 2.
Figure 4:
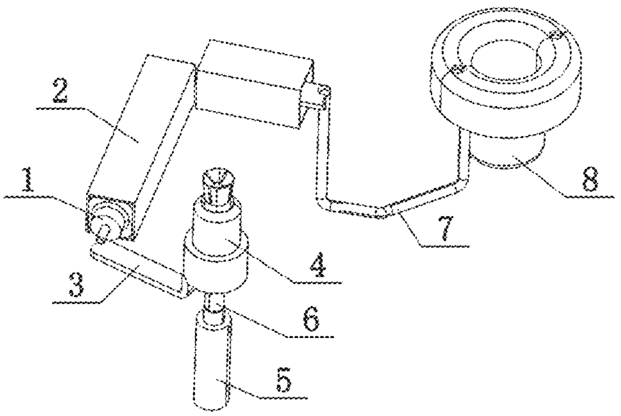
FIG. 4 is a partial view illustrating the structure of a filter according to an embodiment of the present application.
Figure 5:
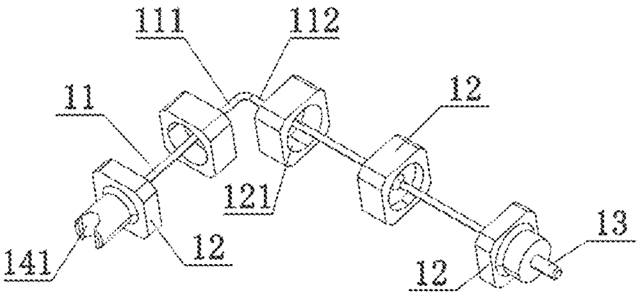
FIG. 5 is a view taken from an orientation to illustrate the structure of a low-pass filter structure according to an embodiment of the present application.
Figure 6:
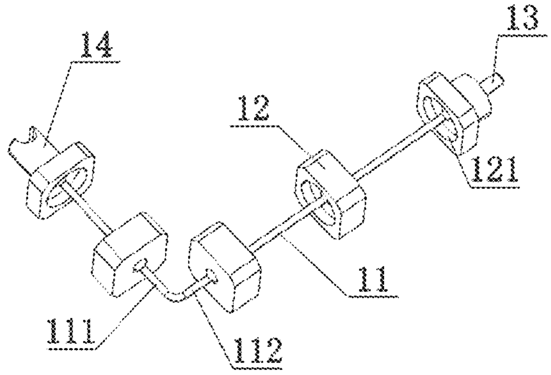
FIG. 6 is a view taken from another orientation to illustrate the structure of a low-pass filter structure according to an embodiment of the present application.
Figure 7:
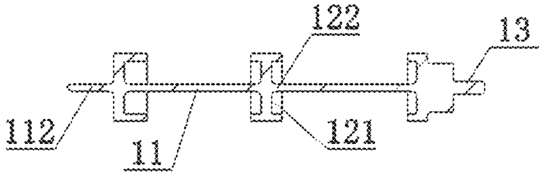
FIG. 7 is a section view of a low-pass filter structure according to an embodiment of the present application.

As shown in FIGS. 1 to 7, the present application provides a filter. The filter includes a low-pass filter structure 1. The low-pass filter structure 1 includes high impedance segments 11 and low impedance segments 12 connected to each other. Two adjacent high impedance segments 11 are connected through a low impedance segment 12. Two adjacent low impedance segments 12 are connected through a high impedance segment 11. At least one high impedance segment 11 is bent to form a bent high resistance segment. The bent high resistance segment includes a first rod segment 111 and a second rod segment 112 that are connected to each other and disposed at an included angle. A low impedance segment 12 is provided with a bypass groove 121. A high resistance connection segment 122 is disposed in the bypass groove 121. One end of the high resistance connection segment 122 is connected to the bottom of the bypass groove 121, and the other end of the high resistance connection segment 122 is connected to a high impedance segment 11.

In the present application, the high impedance segment 11 is bent to form the bent high resistance segment. The first rod segment 111 and the second rod segment 112 of the bent high resistance segment are disposed at an included angle, so that a longer low-pass filter structure 1 can be disposed in limited space, thereby implementing better remote suppression action. On this basis, the high resistance connection segment 122 connected to the high impedance segment 11 is disposed in the bypass groove 121 of the low impedance segment 12. Thus, the length of the high impedance segment 11 is effectively increased, the space utilization rate is improved, and at the same time, the remote suppression action is further improved.

In this embodiment, the diameter of the high impedance segment 11 is less than the diameter of the low impedance segment 12. The diameter of the high resistance connection segment 122 is equal to the diameter of the high impedance segment 11, and the two are coaxially connected. The high impedance segment 11 and the low impedance segment 12 are coaxially connected. The bypass groove 121 is disposed at an end of the low impedance segment 12, or bypass grooves 121 are disposed at two opposite ends of the bypass groove 121.

Specifically, the first rod segment 111 and the second rod segment 112 are perpendicular to each other, so that on the basis of ensuring structural reliability, the space utilization rate is effectively improved.

In this embodiment, among multiple high impedance segments 11, only one high impedance segment 11 is bent to form a bent high resistance segment. The low-pass filter structure 1 is bent to form two parts that are perpendicular to each other.

In other embodiments, the first rod segment 111 and the second rod segment 112 may also be at any other angle. Among multiple high impedance segments 11, two or more high impedance segments 11 may be bent to form bent high resistance segments to more fully adapt to and utilize space.

Specifically, the filter also includes an outer sleeve housing 2. The low impedance segment 12 is disposed in the outer sleeve housing 2. The low-pass filter structure 1 cooperates with the outer sleeve housing 2, which plays the role of high-frequency suppression to filter the high frequency harmonic and high frequency noise of a signal.

In this embodiment, the outer sleeve housing 2 includes a first sleeve housing body and a second sleeve housing body. The first sleeve housing body and the second sleeve housing body are perpendicular to each other. In the two parts formed by bending the low-pass filter structure 1, one part is located in the first sleeve housing body, and the other part is located in the second sleeve housing body. The bent high resistance segment is located outside the first sleeve housing body and the second sleeve housing body. In the first sleeve housing body and the second sleeve housing body, the low impedance segment 12 is a columnar structure whose section is rectangular. Four outer walls abut against the inner walls of the first sleeve housing body or the second sleeve housing body respectively. In other embodiments, the low impedance segment 12 may also be a columnar structure whose section is elliptical or polygonal.

Specifically, the low-pass filter structure 1 also includes a first connection segment 13 and a second connection segment 14. The high impedance segment 11 and the low impedance segment 12 are disposed between the first connection segment 13 and the second connection segment 14. In the preceding disposition, it is convenient for the low-pass filter structure 1 to communicate with other components.

More specifically, the first connection segment 13 is connected to one low impedance segment 12, and the second connection segment 14 is connected to the other low impedance segment 12. In the preceding disposition, the number of low impedance segments 12 is one more than the number of high impedance segments 11. n high impedance segments 11 are interleaved between n+1 low impedance segments 12, so that the disposition of the first connection segment 13 and the second connection segment 14 is more reliable.

In this embodiment, the first connection segment 13 extends from an end of the first sleeve housing body, and the second connection segment 14 extends from an end of the second sleeve housing body.

Specifically, the filter also includes a tap 3. The first connection segment 13 abuts against the tap 3.

More specifically, the filter also includes a connector 4. One end of the tap 3 is connected to the connector 4, and the other end of the tap 3 is connected to first connection segment 13.

More specifically, the filter also includes an insulating sleeve 5 and a metal rod 6. The metal rod 6 is inserted into the insulating sleeve 5. The tap 3 is clamped between the metal rod 6 and the connector 4.

In this embodiment, the connector 4 is connected to the first connection segment 13 of the low-pass filter structure 1 though the tap 3, and transmission is more reliable.

Specifically, the filter also includes a connection rod 7. The second connection segment 14 is provided with a connection groove 141. The connection groove 141 abuts against the periphery wall of the connection rod 7. In the preceding disposition, the contact area of the connection rod 7 and the second connection segment 14 is increased, and the tin accumulation structure in the welding operation is improved.

More specifically, the filter also includes a resonant rod 8. One end of the connection rod 7 abuts against the resonant rod 8, and the other end of the connection rod 7 abuts against the second connection segment 14.

In this embodiment, the second connection segment 14 abuts against the resonant rod 8 through the connection rod 7. The connection groove 141 is disposed at an end of the second connection segment 14 and is disposed through the radial direction of the second connection segment 14, and the section is arc-shaped. The part of the connection rod 7 connecting the connection groove 141 extends in the radial direction of the second connection segment 14. One side extends into the connection groove 141 and completely fits against the inner wall of the connection groove 141.

In this embodiment, the filter also includes a bottom housing 9 and a top cover 10. The low-pass filter structure 1 and the outer sleeve housing 2 are disposed in the bottom housing 9. The connector 4 is disposed in the top cover 10. The insulating sleeve 5 is disposed in the bottom housing 9. The resonant rod 8 is disposed in the bottom housing 9. The top cover 10 is provided with a debugging screw that matches the resonant rod 8.

Apparently, the preceding embodiments of the present application are merely illustrative examples of the present utility and are not intended to limit implementations of the present application. Those of ordinary skill in the art can make changes or variations in other different forms based on the preceding description. All examples cannot be and do not need to be exhausted herein. Any modifications, equivalent substitutions and improvements made within the spirit and principle of the present application fall within the scope of the claims of the present application.

What is claimed is:

1. A filter, comprising:

a low-pass filter structure, wherein the low-pass filter structure comprises high impedance segments and low impedance segments connected to each other, two adjacent high impedance segments of the high impedance segments are connected through a low impedance segment of the low impedance segments, two adjacent low impedance segments of the low impedance segments are connected through a high impedance segment of the high impedance segments, wherein at least one high impedance segment of the high impedance segments is bent to form a bent high resistance segment, and the bent high resistance segment comprises a first rod segment and a second rod segment that are connected to each other and disposed at an included angle, wherein each of the low impedance segments is provided with a bypass groove, a high resistance connection segment is disposed in the bypass groove, one end of the high resistance connection segment is connected to a bottom of the bypass groove, and an other end of the high resistance connection segment is connected to a high impedance segment of the high impedance segments;

wherein the low-pass filter structure further comprises a first connection segment and a second connection segment, and the high impedance segments and the low impedance segments are disposed between the first connection segment and the second connection segment; and wherein the filter further comprises a tap, and the first connection segment abuts against the tap.

2. The filter according to claim 1, wherein the first rod segment and the second rod segment are perpendicular to each other.

3. The filter according to claim 1, further comprising outer sleeve housings, wherein each of the low impedance segments are disposed in one of the outer sleeve housings.

4. The filter according to claim 1, wherein the first connection segment is connected to a low impedance segment of the low impedance segments, and the second connection segment is connected to another low impedance segment of the plurality of low impedance segments.

5. The filter according to claim 1, further comprising a connector, wherein one end of the tap is connected to the connector, and an other end of the tap is connected to the first connection segment.

6. The filter according to claim 5, further comprising:

an insulating sleeve; and a metal rod inserted into the insulating sleeve, wherein the tap is clamped between the metal rod and the connector.

7. A filter, comprising:

a low-pass filter structure, wherein the low-pass filter structure comprises high impedance segments and low impedance segments connected to each other, two adjacent high impedance segments of the high impedance segments are connected through a low impedance segment of the low impedance segments, two adjacent low impedance segments of the low impedance segments are connected through a high impedance segment of the high impedance segments, wherein at least one high impedance segment of the high impedance segments is bent to form a bent high resistance segment, and the bent high resistance segment comprises a first rod segment and a second rod segment that are connected to each other and disposed at an included angle, wherein each of the low impedance segments is provided with a bypass groove, a high resistance connection segment is disposed in the bypass groove, one end of the high resistance connection segment is connected to a bottom of the bypass groove, and an other end of the high resistance connection segment is connected to a high impedance segment of the high impedance segments;

wherein the low-pass filter structure further comprises a first connection segment and a second connection segment, and the high impedance segments and the low impedance segments are disposed between the first connection segment and the second connection segment; and wherein the filter further comprises a connection rod, wherein the second connection segment is provided with a connection groove, and the connection groove abuts against a periphery wall of the connection rod.

8. The filter according to claim 7, further comprising a resonant rod, wherein one end of the connection rod abuts against the resonant rod, and an other end of the connection rod abuts against the second connection segment.

9. The filter according to claim 1, further comprising a connection rod, wherein the second connection segment is provided with a connection groove, and the connection groove abuts against a periphery wall of the connection rod.

10. The filter according to claim 9, further comprising a resonant rod, wherein one end of the connection rod abuts against the resonant rod, and an other end of the connection rod abuts against the second connection segment.

11. The filter according to claim 7, wherein the first rod segment and the second rod segment are perpendicular to each other.

12. The filter according to claim 7, further comprising outer sleeve housings, wherein each of the low impedance segments are disposed in one of the outer sleeve housings.

13. The filter according to claim 7, wherein the first connection segment is connected to a low impedance segment of the low impedance segments, and the second connection segment is connected to another low impedance segment of the plurality of low impedance segments.

14. The filter according to claim 13, further comprising a tap, and the first connection segment abuts against the tap.

15. The filter according to claim 14, further comprising a connector, wherein one end of the tap is connected to the connector, and an other end of the tap is connected to the first connection segment.

16. The filter according to claim 15, further comprising:

an insulating sleeve; and a metal rod inserted into the insulating sleeve, wherein the tap is clamped between the metal rod and the connector.

* * * * *